Figure 1:
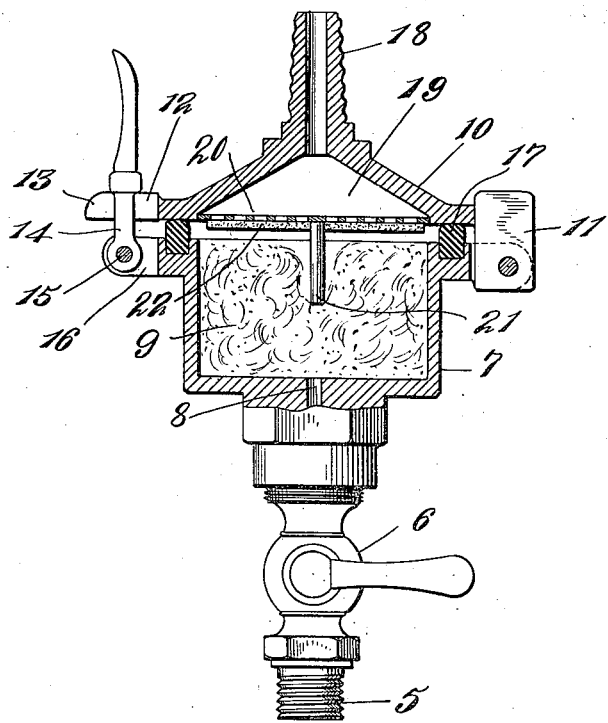

W. J. SMART.
FILTERING DEVICE.
APPLICATION FILED SEPT. 21, 1910.

999,895.

Patented Aug. 8, 1911.

Witnesses:
Harry B. Hebig
Wm. C. Dunn

Inventor
Walter J. Smart
By his Attorney
Clifford E. Dunn

UNITED STATES PATENT OFFICE.

WALTER J. SMART, OF NEW YORK, N. Y.

FILTERING DEVICE.

999,895.　　　　　Specification of Letters Patent.　　Patented Aug. 8, 1911.

Application filed September 21, 1910.　Serial No. 582,974.

*To all whom it may concern:*

Be it known that I, WALTER J. SMART, a citizen of the United States, residing in the city of New York, borough of Manhattan, county and State of New York, have invented certain new and useful Improvements in Filtering Devices, of which the following is a full, clear, and exact specification.

My invention relates to filtering devices generally, but is especially adapted for use in the filtering of gases or vapors, such, for instance, as compressed air, or in fact all gases where it is desirable to free the same from foreign material such as moisture, water, oil or other liquids, dust, dirt or impurities of all kinds.

It is especially adapted for use in all cases where compressed air is employed, including hospital and physicians' service for spraying, or where compressed air is used in the finishing of manufactured articles with lacquer, paint, enamel, japan, bronze, or other liquid materials in an atomized state, where any impurities or foreign material will be detrimental.

In compressing air there is always a condensation of moisture from the atmosphere and of the oil vapor which is generated by the heat of compression in the cylinder. Under service conditions it is also practically impossible to obtain a supply of air which is completely free from foreign matter and impurities and it is one object of my invention to provide at some point near the place of utilization a filtering apparatus which shall completely absorb or remove from the air or gas employed, all entrained moisture or other impurities.

Another feature of my invention consists in providing means for readily cleaning the device and renewing the filtering mediums and the driers or disinfectants.

In the drawing accompanying and forming a part of this specification, a practicable embodiment of one form of my invention is illustrated, wherein—

Figure 2:
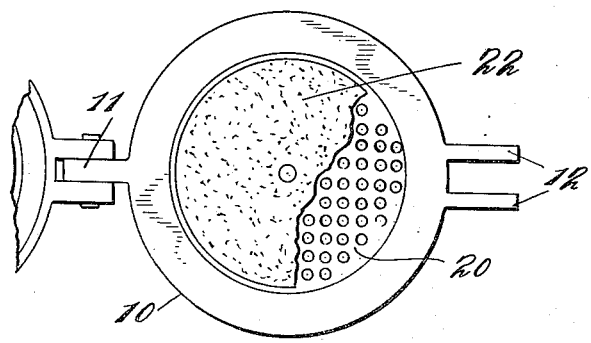

Figure 1 shows an elevation, partly in section, of my improved device. Fig. 2 is an underside view, partly broken away, of the cover portion of the device illustrated in Fig. 1.

The form of the invention herein illustrated is particularly adaptable for use in connection with a hand device for applying or utilizing compressed air, which will be supplied to the apparatus by its receiving portion 5, suitably controlled by a cock 6, and to which the body portion of the filter is attached. The body portion comprises, in the present showing, a casing 7, which has an inlet 8, in communication with the cock 6. The casing 7 is in the form of a chamber which will receive some of the material through which the compressed air, or whatever gas is being employed, may pass. Such material is designated in a general way by 9, and may be cotton for instance, either dry or permeated with some moisture-removing material or a disinfectant, or may consist of a hygroscopic or disinfecting chemical substance. As above stated, compressed air has entrained with it a certain amount of impurities, a certain amount of moisture due to compression, and a certain amount of oil which has been liberated from the compression apparatus by the heat generated by compression. These in many instances may be removed by dry cotton, and in other instances the gas will require to be passed through a filtering material impregnated with some moisture-remover or disinfectant. The casing 7 has mounted upon it a cover 10, which acts as a closure for the chamber within the casing. This cover is shown hinged at 11 to one side of the casing. The cover at the opposite side is provided with a pair of lugs 12, which may be chamfered at 13 to permit a closing lever 14, to ride up on the lugs and hold the lid closed, the lever being shown pivoted at 15 to a pair of lugs 16, carried by the casing. A compression gasket 17, is shown mounted in a groove at the top of the casing and which compression ring will be compressed when the cover is drawn down into position. The cover is provided with a nozzle 18, for receiving some suitable discharge pipe. This nozzle contains the discharge port.

The cover is shown chambered at 19. Below this chamber is a foraminated diaphragm 20, which is shown carrying a pin 21. Upon the supply side of the diaphragm 20, there is mounted a filtering substance 22, which may be a piece of felt of suitable thickness and consistency. This felt will be held in position against the diaphragm 20, by the movement of the gas under treatment, and will also be prevented from displacement by means of the pin 21. The air or gas passing through the filter will have the moisture, oil, and the greater part of the entrained impurities removed by means of the filtering medium 9, but such impurities as are not removed by this medium 9 will be removed by the filtering medium 22. For instance, assuming that the chamber of the casing 7 be filled with cotton, which will remove the oil and moisture and much of the dirt, but will give up to the air a slight amount of lint, this lint will then be caught by the filtering medium 22, which in this instance would preferably be felt. The normal tendency of the passage of the gas through the filter is to drive the filtering medium 9 into close engagement with the filtering medium 22, which in some instances would impair the efficiencies of both mediums. The pin 21, however, is made sufficiently long to enter into the chamber of the casing 7 and hold the filtering medium 9 in position and out of engagement with the filtering medium 22.

When it is desired to clean or renew either or both of the filtering mediums, it is a simple matter to open the lid of the casing by moving the clamping lever, when the interior of the filter is exposed so that the operator may remove and replenish or cleanse the filtering mediums, or supply these with moisture-removing material or disinfectants. This may be done without disconnecting the filter from the source of supply or from the device employed for its utilization.

It is obvious that many modifications may be made in my invention without departing from the spirit thereof, and I do not mean to limit myself to the particular features or constructions shown and described, but

What I claim and desire to secure by Letters Patent is:

1. A filtering device comprising a chamber in communication with a source of supply, a filtering medium in such chamber, a closure for the chamber, an outlet carried by the closure, a foraminated diaphragm carried by the closure and extending over the outlet, a filtering medium disposed upon the supply side of the diaphragm, and means carried by the diaphragm for engaging the filtering medium within the chamber for holding this from engagement with the filtering medium carried by the diaphragm.

2. In a filter, the combination with a casing provided with a chamber, of means for connecting said casing with a source of gas supply, an inlet from said means of connection to said chamber, a cover hinged to one side of said casing and provided with lever-engaging lugs, a lever carried by said casing for engaging the lugs, the casing being provided with an annular groove at its upper portion, a compression gasket seated in said groove for the engagement of the cover, said cover being provided with an outlet and a chamber in communication with the outlet, a foraminated diaphragm carried by such cover at the entrance to the chamber thereof, and a downwardly-directed pin carried by the diaphragm for holding a disk of filtering material in position upon the diaphragm and for engaging filtering material within the chamber of the casing.

3. In a filtering device, the combination with a chamber for holding filtering material, of a foraminated diaphragm disposed therein, and a projection carried by the diaphragm and extending into such chamber for holding the filtering material therein away from the diaphragm.

4. In a filtering device, the combination with a chamber for holding filtering material, of a foraminated diaphragm detachably connected thereto, and a projection on said diaphragm extending into the chamber for centering a sheet of filtering material on the said diaphragm and for holding filtering material in the chamber away from the sheet filtering material.

5. In a filtering device, the combination with a pair of chambered members pivotally connected together, of a foraminated diaphragm carried by one of the members, and a pin carried by said diaphragm and extending into the chamber of the other member for engaging filtering material in such chamber and holding the same away from the diaphragm.

In witness whereof I have hereunto set my hand in the presence of two subscribing witnesses.

WALTER J. SMART.

Witnesses:
  ISADORE BERNSTEIN,
  H. J. FUELLING.